US006823088B2

(12) United States Patent
Kaneko et al.

(10) Patent No.: US 6,823,088 B2
(45) Date of Patent: Nov. 23, 2004

(54) IMAGE DISPLAY SYSTEM AND IMAGE DISPLAY METHOD

(75) Inventors: Hideyuki Kaneko, Tokyo (JP); Shuichi Kagawa, Tokyo (JP); Hiroaki Sugiura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 581 days.

(21) Appl. No.: 09/972,878

(22) Filed: Oct. 10, 2001

(65) Prior Publication Data

US 2002/0167525 A1 Nov. 14, 2002

(30) Foreign Application Priority Data

May 14, 2001 (JP) ....................................... 2001/142876

(51) Int. Cl.[7] ............................ G06K 9/40; G09G 5/00; H04N 5/66

(52) U.S. Cl. ....................... 382/266; 382/162; 345/204; 348/739

(58) Field of Search ................................ 382/162, 167, 382/254, 266, 274, 299, 300; 345/10–11, 22, 156, 204, 205, 501, 606; 348/571, 739

(56) References Cited

U.S. PATENT DOCUMENTS 4,864,290 A * 9/1989 Waters ......................... 345/89
4,886,343 A * 12/1989 Johnson ....................... 349/78
5,225,875 A * 7/1993 Shapiro et al. ............. 345/690
5,299,039 A * 3/1994 Bohannon ....................... 349/6
5,959,693 A * 9/1999 Wu et al. ................... 348/624
6,040,876 A * 3/2000 Pettitt et al. ................ 348/624
6,724,932 B1 * 4/2004 Ito ............................. 382/162

OTHER PUBLICATIONS

C. Betrisey et al.: 20.4: Displaced Filtering for Patterned Displays ISSN000–0966X/00/3101–0296 SID 00 Digest pp 296–299.

* cited by examiner

*Primary Examiner*—Kanji Patel
(74) *Attorney, Agent, or Firm*—Birch, Stewart, Kolasch & Birch, LLP

(57) ABSTRACT

An image display system comprises a display unit which includes regularly arranged red, green and blue pixel elements and which changes a displaying state of the pixel elements to display an image; a pixel data generator which generates pixel data consisting of three items of first pixel element data corresponding to red, green and blue signal levels; a pixel element data generator which converts the pixel data into several items of second pixel element data as a minimum unit data corresponding to the signal levels of respective colors; and a controller which selects any one of a first display mode on the basis of the pixel data outputted from the pixel data generator and a second display mode on the basis of the second pixel element data generated in the pixel element data generator, wherein when selecting the second display mode, the controller sets a pixel number of the pixel data generated in the pixel data generator so as to coincide with a display pixel number of the display unit.

40 Claims, 7 Drawing Sheets

IMAGE DISPLAY SYSTEM AND IMAGE DISPLAY METHOD

BACKGROUND OF THE INVENTION

The present invention relates to an image display system such as a personal computer having image processing functions including resolution adjustment, edge enhancement and gradation characteristic control, and an image display method. More particularly, the present invention concerns control for reducing generation of a false color.

FIGS. 5A and 5B are views for explaining a technique for increasing an apparent resolution. In the figures, one rectangle denotes one of pixel elements of a display panel (e.g., a liquid crystal panel), and a number given in each rectangle denotes a signal level (in units of %) of an image signal to display the pixel element. In the display panel, three adjacent pixel elements of red (R), green (G) and blue (B) constitute a single pixel. Such a display method in which a pixel is used as a minimum unit (for example, colors of R, G and B have all a signal level of 100%) as shown in FIG. 5A can be changed to a display method in which a pixel element is used as a minimum unit (for example, in the units of (R, G, B, R) or (G, B, R, G) or (B, R, G, B)), as shown in FIG. 5B. When such a display method as shown in FIG. 5B, in which a pixel element is used as a minimum unit, is employed, an apparent resolution can be improved.

FIGS. 6A and 6B are graphs for explaining the interpolating processing of an image signal. In the figures, reference symbols $P_1$, $P_2$, $P_3$, $P_{12}$ and $P_{23}$ denote pixels arranged on a display panel respectively, and each pixel is made up of three colors R, G and B (i.e., three pixel elements). A vertical axis or ordinate in the figure denotes a level (in units of %) of an image signal used to display each pixel element. The image signal for displaying the three pixels $P_1$, $P_2$ and $P_3$ is subjected to interpolating processing as shown in FIG. 6A to form an image signal for displaying pixels $P_{12}$ and $P_{23}$ as shown in FIG. 6B. The signal level of the pixel $P_{12}$ corresponds to an average (50%) of the signal level (0%) of the pixel $P_1$ and the signal level (100%) of the pixel $P_2$, whereas the signal level of the pixel $P_{23}$ corresponds to an average (50%) of the signal level (100%) of the pixel $P_2$ and the signal level (0%) of the pixel $P_3$. Even when the number (e.g., 800×600 dots) of pixels in pixel data generated (or inputted) through such interpolating processing becomes different from the display pixel number (e.g., 1024×768 dots) of a display panel, the pixel data can be displayed on the entire area of the display panel.

However, when such a display method in which a pixel element is used as a minimum unit (to increase an apparent resolution) as shown in FIG. 5B is carried out simultaneously with such interpolating processing of the image signal as shown in FIG. 6B, this involves a problem that such a color appears that should not be perceived at a location away from a suitable display position on the display panel, or a problem that a false color is generated that a color perceived different from its suitable color is displayed.

FIGS. 7A and 7B are graphs for explaining why a false color becomes remarkable when the interpolating processing of an image signal and the operation of increasing an apparent resolution are carried out at the same time. In the figures, reference symbols $P_{01}$, $P_1$, $P_2$, $P_3$, $P_{12}$ and $P_{23}$ denote pixels arranged on the display panel respectively. Further, a vertical axis or ordinate denotes the level of an image signal for displaying pixel elements (in units of %). When an image made up of pixel elements B, R, G and B having signal levels of 40, 100, 100 and 60 respectively is subjected to interpolating processing as shown in FIG. 7A, a pixel element B having a signal level of 20% appears in the pixel $P_{01}$ at a position away from those of the other pixel elements as shown in FIG. 7B. Due to the pixel element appearing at such a distant position, a user perceives the appearance of an unnatural color.

SUMMARY OF THE INVENTION

It is therefore an object of the present invention to provide an image display system and an image display method that can reduce generation of a false color.

According to one aspect of the present invention, an image display system comprises: a display unit which includes regularly arranged red, green and blue pixel elements and which changes a displaying state of the pixel elements to display an image; a pixel data generator which generates pixel data consisting of three items of first pixel element data corresponding to red, green and blue signal levels; a pixel element data generator which converts the pixel data into several items of second pixel element data as a minimum unit data corresponding to the signal levels of the respective colors; and a controller which selects any one of a first display mode of displaying an image on the display unit on the basis of the pixel data outputted from the pixel data generator and a second display mode of displaying an image on the display unit on the basis of the second pixel element data generated in the pixel element data generator, wherein when selecting the second display mode, the controller sets a pixel number of the pixel data generated in the pixel data generator so as to coincide with a display pixel number of the display unit.

According to another aspect of the present invention, an image display system comprises: a display unit which includes regularly arranged red, green and blue pixel elements and which changes a displaying state of the pixel elements to display an image; a pixel data generator which generates pixel data consisting of three items of first pixel element data corresponding to red, green and blue signal levels; an operating unit, through which an operator designates a pixel number of the pixel data generated in the pixel data generator; a pixel element data generator which converts the pixel data into several items of second pixel element data as a minimum unit data corresponding to the signal levels of the respective colors; and a controller which selects any one of a first display mode of displaying an image on the display unit on the basis of the pixel data outputted from the pixel data generator and a second display mode of displaying an image on the display unit on the basis of the second pixel element data generated in the pixel element data generator, wherein when the second display mode is being selected and a value different from a display pixel number of the display unit is designated as a pixel number of the pixel data generated in the pixel data generator through the operating unit, the controller changes the current display mode to the first display mode.

According to further aspect of the present invention, an image display system comprises: a display unit which includes regularly arranged red, green and blue pixel elements and which changes a displaying state of the pixel elements to display an image; a pixel data generator which generates pixel data consisting of three items of first pixel element data corresponding to red, green and blue signal levels; a pixel element data generator which converts the pixel data into several items of second pixel element data as a minimum unit data corresponding to the signal levels of the respective colors; an edge enhancement processor which performs image processing to enhance an edge of an image to be displayed on the display unit; and a controller which selects any one of a first display mode of displaying an image on the display unit on the basis of the pixel data outputted from the pixel data generator and a second display mode of displaying an image on the display unit on the basis of the second pixel element data generated in the pixel element data generator, wherein the controller causes the edge enhancement processor not to perform the image processing when the second display mode is being selected.

According to further aspect of the present invention, an image display system comprises: a display unit which includes regularly arranged red, green and blue pixel elements and which changes a displaying state of the pixel elements to display an image; a pixel data generator which generates pixel data consisting of three items of first pixel element data corresponding to red, green and blue signal levels; a pixel element data generator which converts the pixel data into several items of second pixel element data as a minimum unit data corresponding to the signal levels of the respective colors; a gradation characteristic controller which controls a gradation characteristic of the image to be displayed on the display unit; and a controller which selects any one of a first display mode of displaying an image on the display unit on the basis of the pixel data outputted from the pixel data generator and a second display mode of displaying an image on the display unit on the basis of the second pixel element data generated in the pixel element data generator, wherein when selecting the second display mode, the controller controls operation of the gradation characteristic controller in such a manner that the gradation characteristic of the image to be displayed on the display unit is changed to a characteristic suitable for processing contents of the pixel element data generator.

According to further aspect of the present invention, a method for displaying an image, which is used in an image display system comprising a display unit which includes regularly arranged red, green and blue pixel elements and which changes a displaying state of the pixel elements to display an image; the method comprises: generating pixel data consisting of three items of first pixel element data corresponding to red, green and blue signal levels by a pixel data generator; converting the pixel data into several items of second pixel element data as a minimum unit data corresponding to the signal levels of the respective colors by a pixel element data generator; and selecting any one of a first display mode of displaying an image on the display unit on the basis of the pixel data outputted from the pixel data generator and a second display mode of displaying an image on the display unit on the basis of the second pixel element data generated in the pixel element data generator, wherein when selecting the second display mode, a pixel number of the pixel data generated in the pixel data generator is set so as to coincide with a display pixel number of the display unit.

According to further aspect of the present invention, a method for displaying an image, which is used in an image display system comprising a display unit which includes regularly arranged red, green and blue pixel elements and which changes a displaying state of the pixel elements to display an image; the method comprises: generating pixel data consisting of three items of first pixel element data corresponding to red, green and blue signal levels by a pixel data generator; designating a pixel number of the pixel data generated in the pixel data generator by an operator through an operating unit; converting the pixel data into several items of second pixel element data as a minimum unit data corresponding to the signal levels of the respective colors by a pixel element data generator; and selecting any one of a first display mode of displaying an image on the display unit on the basis of the pixel data outputted from the pixel data generator and a second display mode of displaying an image on the display unit on the basis of the second pixel element data generated in the pixel element data generator, wherein when the second display mode is being selected and a value different from a display pixel number of the display unit is designated as a pixel number of the pixel data generated in the pixel data generator through the operating unit, the current display mode is changed to the first display mode.

According to further aspect of the present invention, a method for displaying an image, which is used in an image display system comprising a display unit which includes regularly arranged red, green and blue pixel elements and which changes a displaying state of the pixel elements to display an image; the method comprises: generating pixel data consisting of three items of first pixel element data corresponding to red, green and blue signal levels by a pixel data generator; converting the pixel data into several items of second pixel element data as a minimum unit data corresponding to the signal levels of the respective colors by a pixel element data generator; performing image processing to enhance an edge of an image to be displayed on the display unit by an edge enhancement processor; and selecting any one of a first display mode of displaying an image on the display unit on the basis of the pixel data outputted from the pixel data generator and a second display mode of displaying an image on the display unit on the basis of the second pixel element data generated in the pixel element data generator, wherein the edge enhancement processor does not perform the image processing when the second display mode is being selected.

According to further aspect of the present invention, a method for displaying an image, which is used in an image display system comprising a display unit which includes regularly arranged red, green and blue pixel elements and which changes a displaying state of the pixel elements to display an image; the method comprises: generating pixel data consisting of three items of first pixel element data corresponding to red, green and blue signal levels by a pixel data generator; converting the pixel data into several items of second pixel element data as a minimum unit data corresponding to the signal levels of the respective colors by a pixel element data generator; controlling a gradation characteristic of the image to be displayed on the display unit by a gradation characteristic controller; and selecting any one of a first display mode of displaying an image on the display unit on the basis of the pixel data outputted from the pixel data generator and a second display mode of displaying an image on the display unit on the basis of the second pixel element data generated in the pixel element data generator, wherein when selecting the second display mode, the gradation characteristic controller operates in such a manner that the gradation characteristic of the image to be displayed on the display unit is changed to a characteristic suitable for processing contents of the pixel element data generator.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
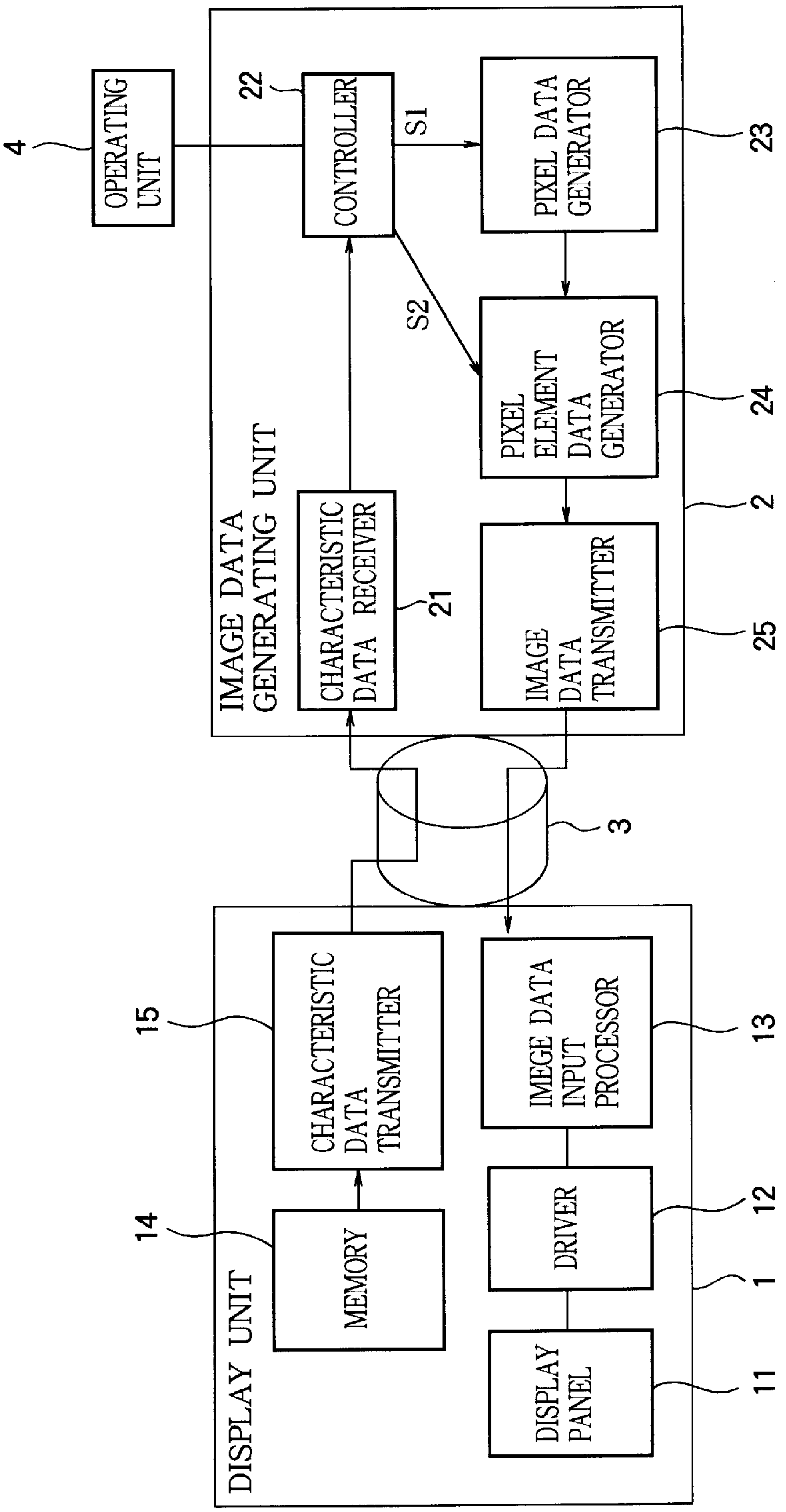
FIG. 1 is a block diagram showing a configuration of an image display system according to a first embodiment of the present invention.

FIG. 1 is a block diagram showing a configuration of an image display system according to the first embodiment of the present invention.

As shown in FIG. 1, the image display system according to the first embodiment includes a display unit 1, an image data generating unit 2 for generating and outputting image data, a transmission line 3 for carrying the data between the both, and an operating unit 4. Although the image display system is intended to be a personal computer (PC) as an example in the following explanation, the system may be any device other than the PC. Further, for example, a liquid crystal monitor unit or a CRT unit is used as the display unit, but a display unit employing another display system may be employed. The image data generating unit 2 is, for example, a main unit of the PC. Usable as the transmission line 3 is, for example, a monitor connection cable. Usable as the operating unit 4 is, for example, a keyboard and/or a mouse. However, the operating unit 4 is not limited to the one connected to the image data generating unit 2 but may include an operating button and the like mounted on the display unit 1. In FIG. 1, the constituent elements 1 to 4 are illustrated as ones independent of each other, but the present invention may be applied to an integral-type PC which integrally includes a monitor unit, a PC body and a connection cable, or applied to a notebook-type PC which integrally includes a monitor unit, a PC body, a connection cable and an operating unit.

As shown in FIG. 1, the display unit 1 has a display panel 11, a driver 12 for the display panel 11, and an image data input processor 13 for receiving image data from the image data generating unit 2. The driver 12, on the basis of the image data received in the image data input processor 13, causes the display panel 11 to display the image. The display unit 1 also has a memory 14 for previously storing information (characteristic data) including the number of display pixels (which will be referred to as "display pixel number") on the display panel 11, and a characteristic data transmitter 15 for the information stored in the memory 14 to the image data generating unit 2 via the transmission line 3. The memory 14 such as a ROM has characteristic data including the display pixel number of the display panel 11 previously stored therein at the stage of its manufacture. The memory 14 is not always required to be provided within the display unit 1, but may be provided at another location such as an interior of the image data generating unit 2.

As shown in FIG. 1, the image data generating unit 2 has a characteristic data receiver 21 for receiving the characteristic data from the characteristic data transmitter 15 of the display unit 1 and for outputting data about the display pixel number of the display panel 11, and a controller 22 for controlling the operation of the entire image display system. The image data generating unit 2 further has a pixel data generator 23 for generating pixel data consisting of three items of first pixel element data corresponding to signal levels of R, G and B (that is, generating signal data of pixel as a minimum unit, each pixel consisting of pixel elements of three R, G and B colors). The image data generating unit 2 further has a pixel element data generator 24 which converts the pixel data into several items of second pixel element data as a minimum unit data corresponding to the signal levels of respective colors, and an image data transmitter 25 for transmitting the image data to the display unit 1 through the transmission line 3.

The pixel data generator 23 generates pixel data, a pixel number of which is determined on the basis of a pixel number designation signal $S_1$ received from the controller 22. The designation of the pixel number is carried out by the user on the operating unit 4. The designation is carried out, for example, by the user who selects one of predetermined pixel numbers (resolutions) of 640×480 dots, 800×600 dots, 1024×768 dots and so on, but another input method may be employed. Further, the designated pixel number is not limited to the specific values given above. The controller 22, according to the operating conditions of the image display system, switches the pixel number designation signal $S_1$ in such a manner as will be explained later.

Figure 6A:
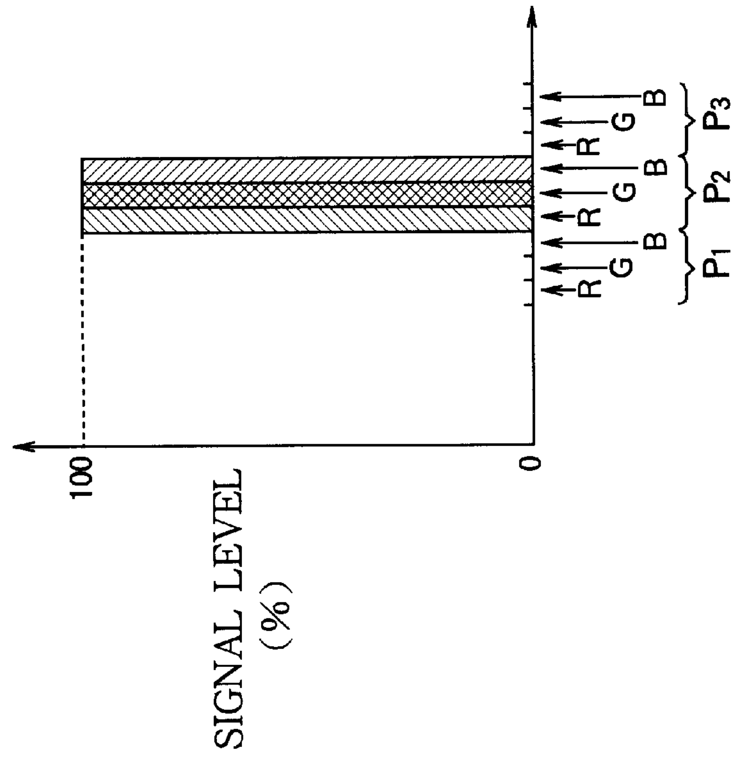
FIG.6A CONVENTIONAL ART
FIGS. 6A and 6B are graphs for explaining interpolating processing of an image signal.
Figure 6B:
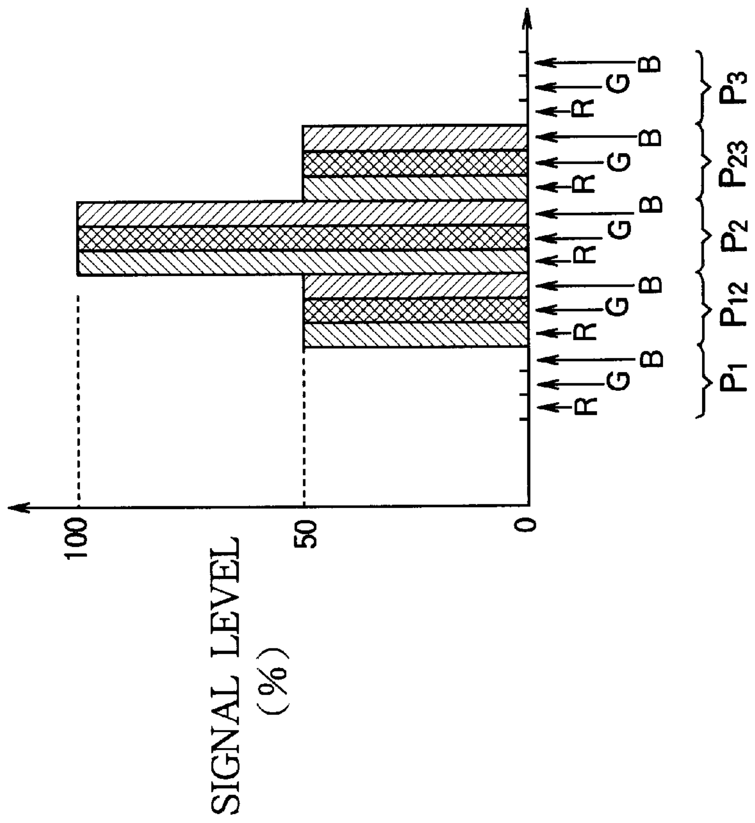
FIG.6B CONVENTIONAL ART

The pixel data generator 23 has two modes when it outputs the generated pixel data as it is without changing it and when it subjects the generated pixel data to an interpolating processing (or a decimating processing) and then outputs it. When the pixel number of the generated pixel data is different from the display pixel number of the display panel 11, the pixel data generator 23 has a function of interpolating the generated pixel data in such a manner that the pixel number of the generated pixel data coincides with the display pixel number of the display panel 11 and then outputting it. The interpolating processing is carried out, for example, in such a manner as shown in FIGS. 6A and 6B. In this connection, it is not always required that the interpolation be carried out for a pixel having an average of the signal levels of pixels adjacent thereto. Any other interpolation method may be employed so long as it can make the pixel number of the pixel data to coincide with the display pixel number of the display panel 11. Through such interpolating processing, the pixel number of the pixel data as the output of the pixel data generator 23 can be changed so as to coincide with the display pixel number of the display panel 11 and thus the image can be displayed on the entire area of the display panel 11.

Figure 5A:
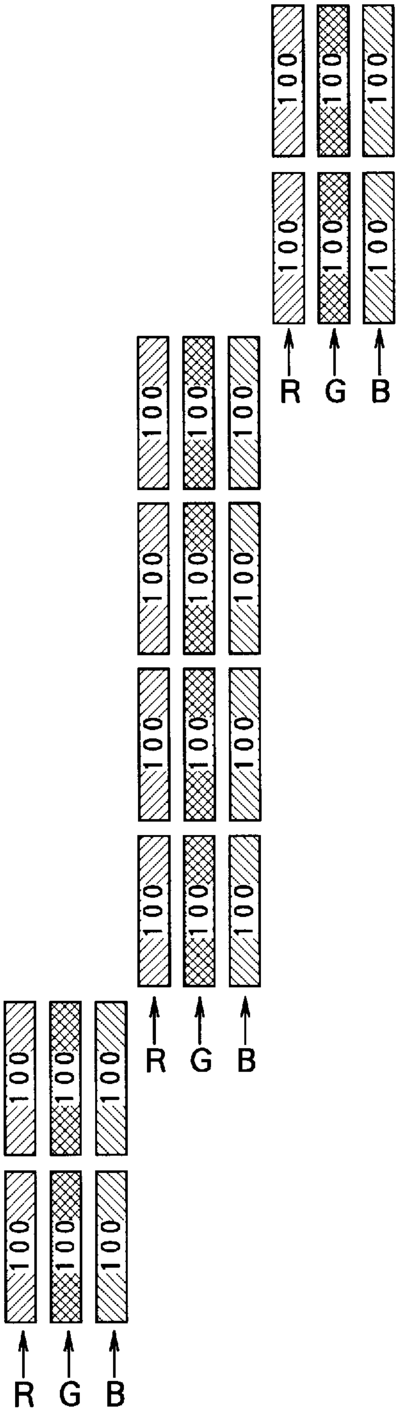
FIG.5A CONVENTIONAL ART
FIGS. 5A and 5B are views for explaining a technique for increasing an apparent resolution.
Figure 5B:
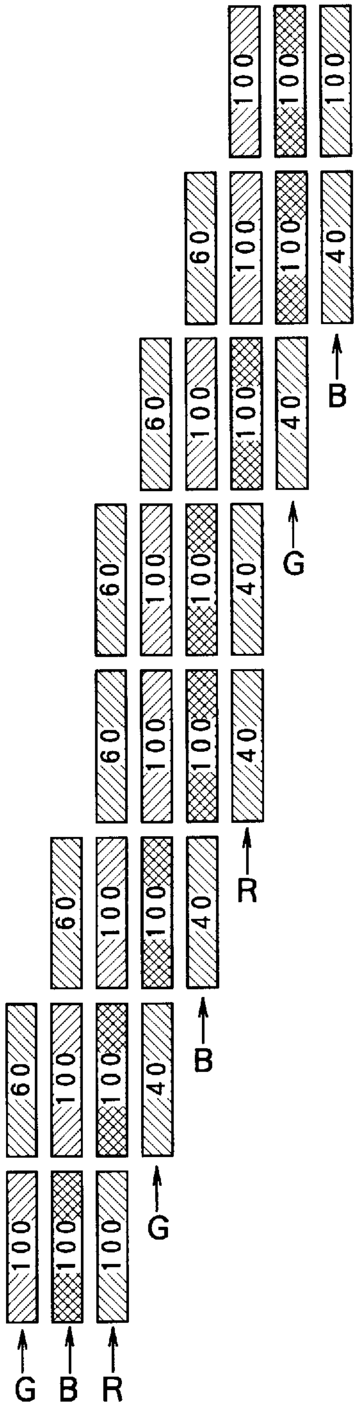
FIG.5B CONVENTIONAL ART

The controller 22 controls the system to select any one of two modes, that is a first display mode wherein the image is displayed on the display panel 11 on the basis of the pixel data, which consists of three items of pixel element data (i.e., first pixel element data), issued from the pixel data generator 23, and a second display mode wherein the image is displayed on the display panel 11 on the basis of the pixel element data (i.e., second pixel element data) generated by the pixel element data generator 24. The selection of the display modes is carried out by the pixel element data generator 24 on the basis of an image data switching signal $S_2$ received from the controller 22. The image data switching signal $S_2$ includes any of information that the signal is valid (to instruct the pixel element data generator 24 to execute its transforming processing) and information that the signal is invalid (to instruct the pixel element data generator 24 not to execute its transforming processing but to pass the pixel data of the output of the pixel data generator 23 therethrough). The selection of the valid or invalid information is made by the user through the operating unit 4 or by the controller 22. When the image data switching signal $S_2$ is valid, the pixel element data generator 24 is changed to the second display mode and thus outputs the pixel element data generated in the pixel element data generator 24 to the image data transmitter 25 as image data. When the image data switching signal $S_2$ is invalid, on the other hand, the controller 22 changes the current display mode to the first display mode and thus outputs the pixel data as the output of the pixel data generator 23 to the image data transmitter 25 as image data. The image data transmitter 25 transmits the image data to the display unit 1 through the transmission line 3. When the second display mode (corresponding to FIG. 5B) is selected, its apparent resolution can be made higher than that when the first display mode (corresponding to FIG. 5A) is selected.

In the image display system and method of the first embodiment, when selecting the second display mode to display the image on the display unit 1 on the basis of the pixel element data generated in the pixel element data generator 24, the controller 22 controls the system to set the pixel number of the pixel data generated in the pixel data generator 23 to the same value as the display pixel number of the display panel 11 (that is, to cause the pixel number designated by the pixel number designation signal to coincide with the display pixel number of the display panel 11). This control is carried out even when a pixel number different from the display pixel number of the display unit 1 is previously entered from the operating unit 4 through user's operation. As a result, the pixel data generated in the pixel data generator 23 can be outputted without being subjected to the interpolating processing.

When the first display mode is being selected to display an image on the display unit 1 on the basis of the image data issued from the pixel data generator 23 and the pixel number specified by the operating unit 4 is the same as the display pixel number of the display panel 11, the pixel data generated in the pixel data generator 23 is outputted without being subject to the interpolating processing as it is, passed through the pixel element data generator 24 and image data transmitter 25, and then transmitted to the display unit 1 as the image data. In the selected first display mode, further, when the pixel number specified by the operating unit 4 is different from the display pixel number of the display panel 11, a command received from the controller 22 causes the pixel data generator 23 to subject the generated pixel data to the interpolating processing in such a manner that the number of pixels in the pixel data issued from the pixel data generator 23 coincides with the display pixel number of the display panel 11.

In the event where the second display mode is being selected to improve an apparent resolution, if a pixel number different from the display pixel number of the display panel 11 is specified by the operating unit 4, then the controller 22 changes the current second display mode to the first display mode, and the pixel data generator 23 performs the interpolating processing over the image data generated therein transmits it to the display unit 1 as image data. In this connection, even when a pixel number different from the display pixel number is specified by the operating unit 4 in the selected second display mode, such control as to ignore the command or such control as to display a message instructing "to change the current display mode to the first display mode and thereafter to execute the switching operation of the pixel number" may be executed.

Figure 7B:
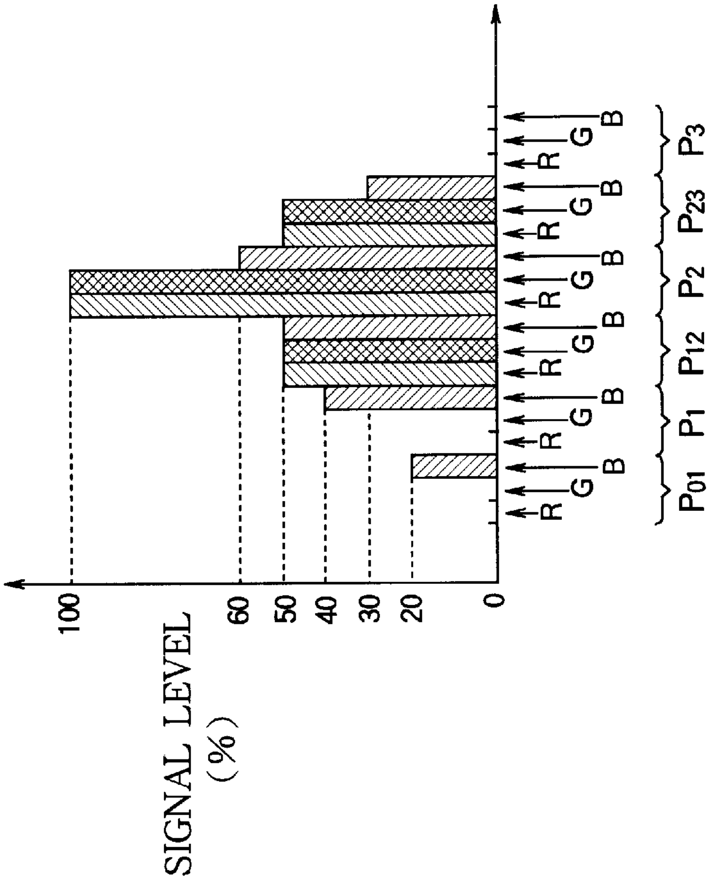
FIG.7B CONVENTIONAL ART
FIGS. 7A and 7B are graphs for explaining why a false color becomes remarkable when operation of increasing an apparent resolution and interpolating processing of an image signal are carried out at the same time.
Figure 7A:
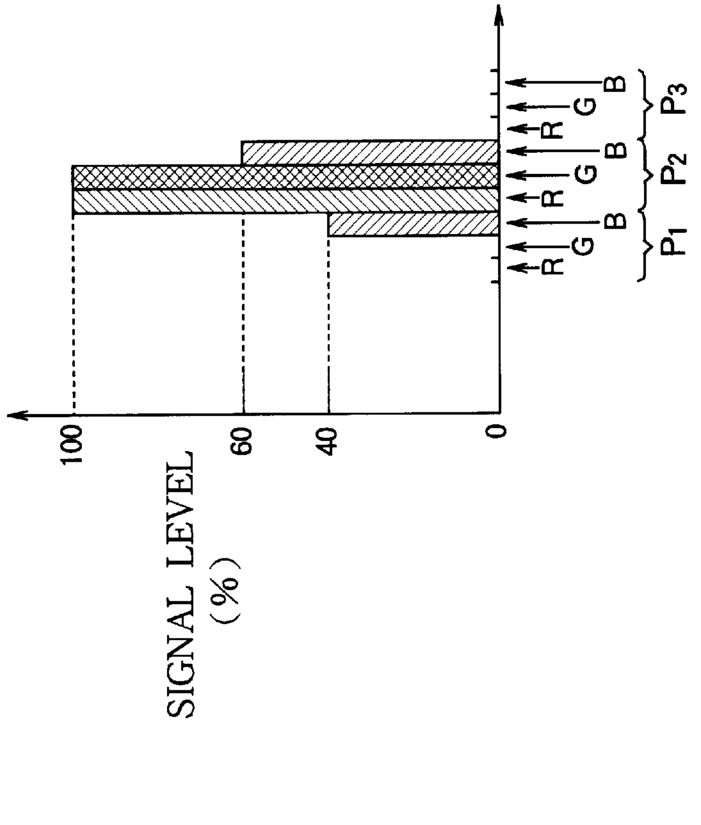
FIG.7A CONVENTIONAL ART

As has been explained above, in the image display system and method of the first embodiment, when the second display mode is selected to display an image on the basis of the pixel element data, the specified pixel number of the pixel data is made to coincide with the display pixel number of the display panel 11, thus eliminating the need for the interpolating processing in the pixel data generator 23. In the image display system and method of the first embodiment, in this way, the signal processing operation of increasing an apparent resolution to display its image on the basis of the pixel element data will not be carried out simultaneously with the interpolating processing of the pixel data generator 23. Accordingly, the image display system and method of the first embodiment can reduce such generation of a false color as shown in FIG. 7B.

Second Embodiment

Figure 2:
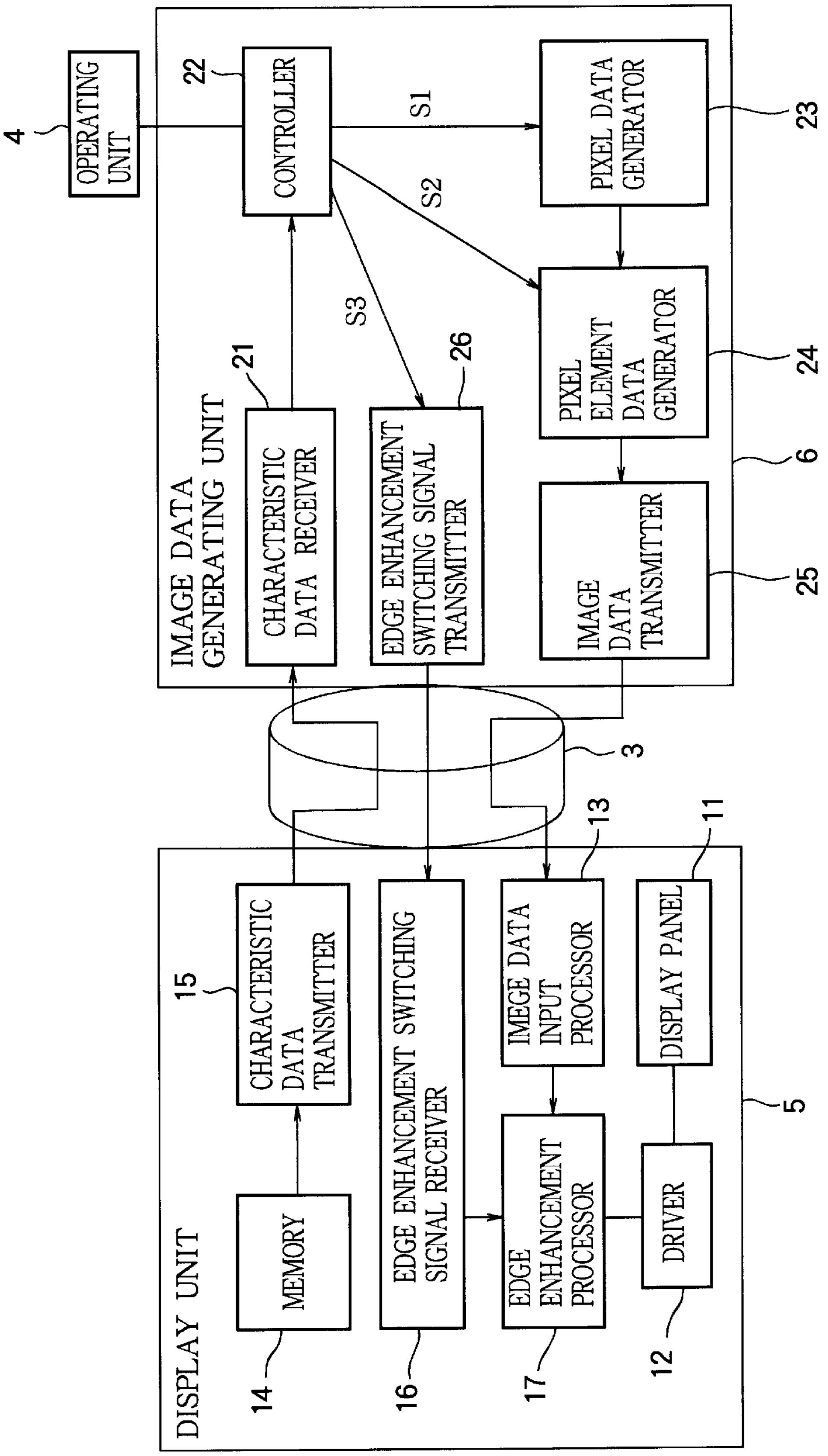
FIG. 2 is a block diagram showing a configuration of an image display system according to a second embodiment of the present invention.

FIG. 2 is a block diagram showing a configuration of an image display system according to the second embodiment of the present invention. In FIG. 2, the same constituent elements as or corresponding to those in FIG. 1 are denoted by the same reference numerals or symbols.

As shown in FIG. 2, the image display system of the second embodiment includes a display unit 5 that has an edge enhancement switching signal receiver 16 and an edge enhancement processor 17. The image display system of the second embodiment also includes an image data generator 6 that has an edge enhancement switching signal transmitter 26.

The edge enhancement processor 17 has a function of detecting larger one of differences in signal level between adjacent pixels on the display panel 11 and intentionally changing the signal level to enhance a contrast. A command about image processing for the edge enhancement is issued by the user from the operating unit 4. In response to the image processing command, the controller 22 outputs an edge enhancement processing select signal $S_3$ to the edge enhancement switching signal transmitter 26. The edge enhancement switching signal transmitter 26 transmits the edge enhancement processing select signal to the edge enhancement switching signal receiver 16. The edge enhancement switching signal receiver 16 sends the edge enhancement processing select signal to the edge enhancement processor 17. When detecting that the edge enhancement processing select signal is valid, the edge enhancement processor 17 performs image processing over the image data inputted into the image data input processor 13. At this time, the driver 12 displays its image on the display panel 11 on the basis of the image data subjected to the image processing for the edge enhancement. When the controller 22 receives a command from the operating unit 4 to execute the image processing of the edge enhancement in the selected second display mode of the controller 22, the controller may control the system to select the image processing for edge enhancement preferentially over the second display mode and change the current display mode to the first display mode. Other arrangement than the above is similar to that of the image display system of the first embodiment.

When image data of the pixel element data generated in the pixel element data generator 24 is displayed through the image processing for edge enhancement (that is, when the image processing is carried out for edge enhancement in the second display mode), there sometimes occurs a problem in the prior art that coloring is enhanced and a false color is perceived by the user. In the image display system and method of the second embodiment, when the second display mode is selected to display an image on the basis of the image data of the pixel element data generated in the pixel element data generator 24, the image processing for edge enhancement is made invalid, thus enabling suppression of generation of a false color.

Third Embodiment

Figure 3:
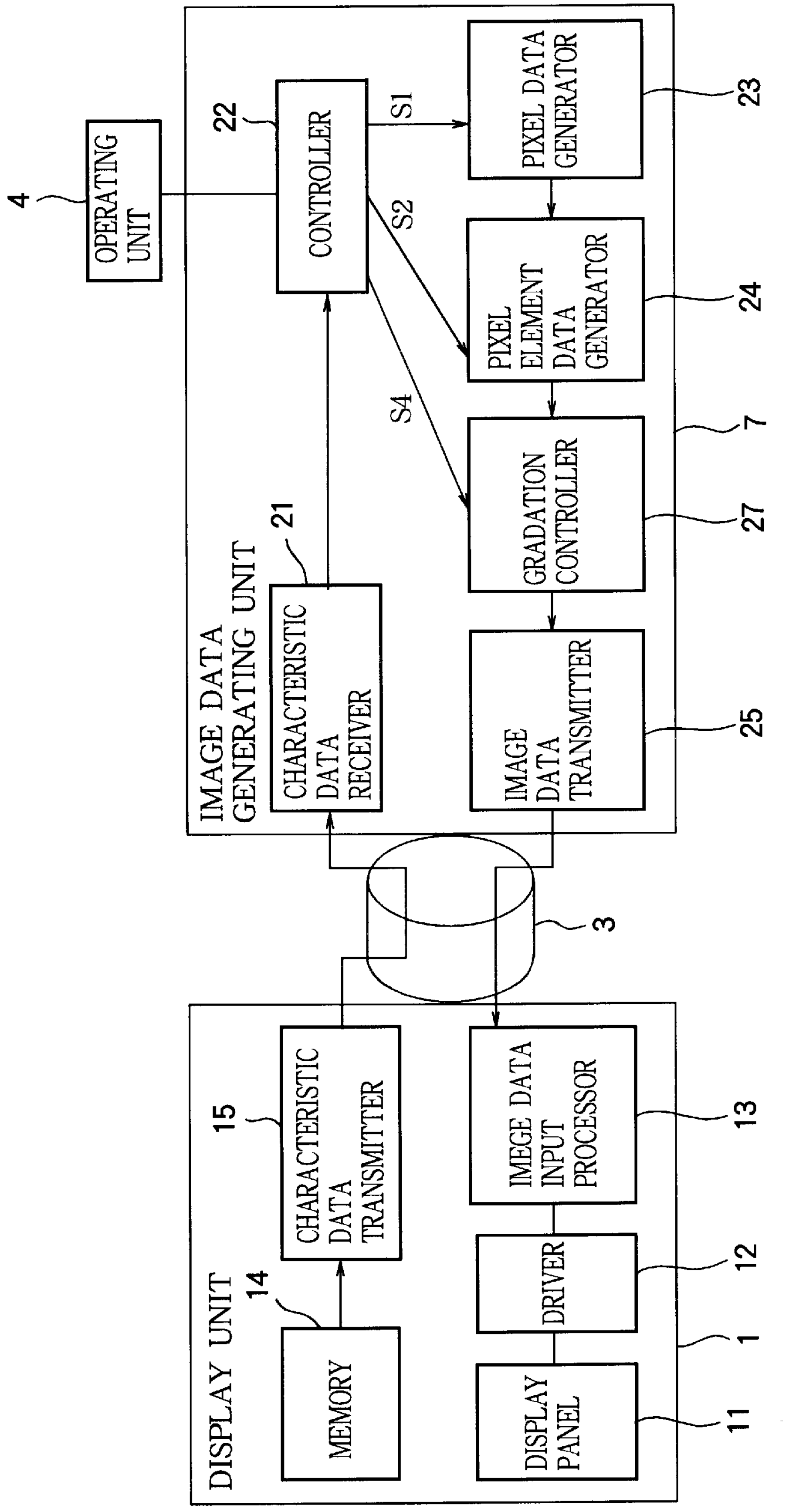
FIG. 3 is a block diagram showing a configuration of an image display system according to a third embodiment of the present invention.

FIG. 3 is a block diagram showing a configuration of an image display system according to another third embodiment of the present invention. In FIG. 3, the same constituent elements as or corresponding to those in FIG. 1 and FIG. 2 are denoted by the same reference numerals or symbols.

As shown in FIG. 3, the image display system of the third embodiment includes an image data generator 6 that has a gradation characteristic controller 27 therein. Other arrangement than the above is similar to that of the image display system of the foregoing first or second embodiment.

In the image display system and method of the third embodiment, the controller 22 outputs the pixel number designation signal $S_1$ to the pixel data generator 23 and simultaneously outputs the image data switching signal $S_2$ to the pixel element data generator 24. At this time, when determining that the image data switching signal $S_2$ is valid, the controller 22 also sends a gradation characteristic designation signal $S_4$ to the gradation characteristic controller 27. A gradation characteristic value to be designated by the gradation characteristic designation signal $S_4$ is set so that the image data switching signal $S_2$ can be made valid to generate pixel element data and image data of the generated pixel element data can be optimally displayed. The controller 22, for example, previously holds gradation characteristic data (gamma characteristic) showing correlations between various types of information about pixel element data generated in the pixel element data generator 24 and optimum gradation characteristics, selects optimum one of the gradation characteristics previously held therein on the basis of the generated pixel element data, and sends the gradation characteristic designation signal $S_4$ indicative of the selected gradation characteristic to the gradation characteristic controller 27.

When an image (second display mode) of pixel elements as minimum units based on the pixel element data generated in the pixel element data generator 24 is displayed through the aforementioned control, the optimum gradation characteristic can be selected and a disadvantage of a false color generated by a combination of display of the image of pixel elements as the minimum units and an unsuitable gradation characteristic can be avoided.

Fourth Embodiment

Figure 4:
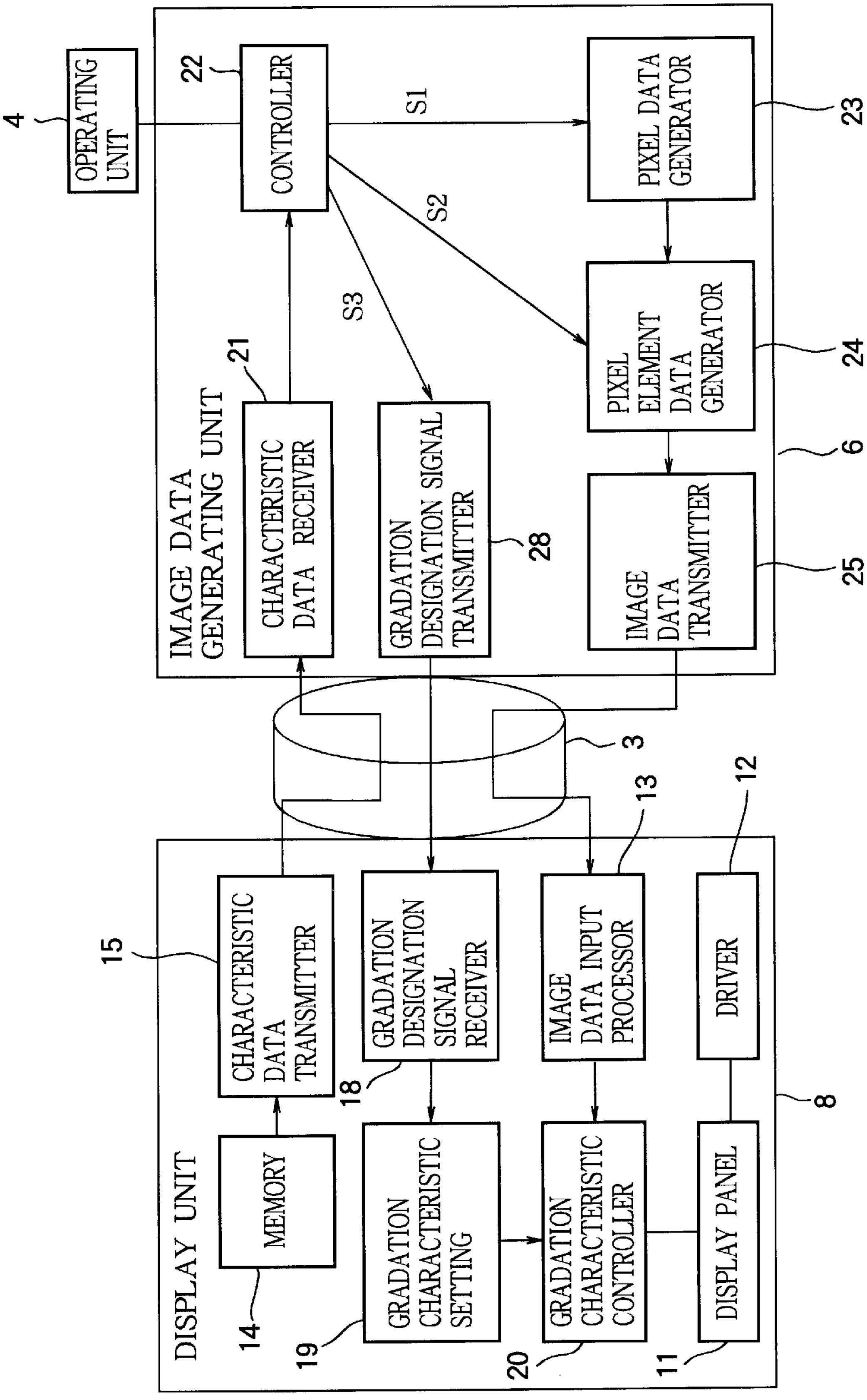
FIG. 4 is a block diagram showing a configuration of an image display system according to a fourth embodiment of the present invention.

FIG. 4 is a block diagram showing a configuration of an image display system according to another fourth embodiment of the present invention. In FIG. 4, the same constituent elements as those in FIG. 1 to FIG. 3 or corresponding thereto are denoted by the same reference numerals or symbols.

As shown in FIG. 4, the image display system of the fourth embodiment includes an image data generating unit 9 which has a gradation designation signal transmitter 28 therein. The image display system of the fourth embodiment also includes a display unit 8. The display unit 8 has a gradation designation signal receiver 18 for receiving gradation characteristic designation data from the gradation designation signal transmitter 28, a gradation characteristic setting portion 19 for setting and outputting a predetermined gradation characteristic, and a gradation characteristic controller 20 for adjusting and outputting the image data processed by the image data input processor 13 to the set gradation characteristic. Other arrangement than the above is similar to that of the image display systems of the foregoing first to third embodiments.

In the image data generating unit 9, the controller 22 outputs the pixel number designation signal $S_1$ to the display unit 8 to generate an image signal, and simultaneously outputs the image data switching signal $S_2$ to the image data generating unit 9. At this time, when the controller 22 designates that the image data switching signal $S_2$ is valid and outputs the signal, the controller 22 simultaneously sends a gradation characteristic designation signal $S_5$ to the gradation designation signal transmitter 28. The transmitter 28 transmits the received signal $S_5$ to the gradation designation signal receiver 18 via the transmission line 3. The gradation designation signal receiver 18 in turn outputs the received signal $S_5$ to the gradation characteristic setting portion 19, which in turn outputs predetermined gradation characteristic data to the gradation characteristic controller 20.

The gradation characteristic controller 20 adjusts image data processed by the image data input processor 13 to a predetermined gradation characteristic and outputs it. At this time, when a gradation characteristic value to be designated is previously set to a value similar to in the foregoing third embodiment and adjusted to an optimum gradation characteristic, there can be suppressed a disadvantage that coloring takes place in an image of pixel elements. The image display system and method of the fourth embodiment can have effects similar to the foregoing third embodiment.

The image display system may be configured by combining the arrangements of the foregoing first to fourth embodiments. For example, the operation of improving an apparent resolution by the pixel element data generator 24, the interpolating processing by the pixel data generator 23, the image processing for edge enhancement by the edge enhancement processor 17, and the function of selecting two or more of the image processing operations in the gradation control by the gradation characteristic controller 20 or gradation characteristic controller 27 and executing them can be provided to a single image display system.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An image display system comprising:

a display unit which includes regularly arranged red, green and blue pixel elements and which changes a displaying state of said pixel elements to display an image;

a pixel data generator which generates pixel data consisting of three items of first pixel element data corresponding to red, green and blue signal levels;

a pixel element data generator which converts said pixel data into several items of second pixel element data as a minimum unit data corresponding to said signal levels of the respective colors; and a controller which selects any one of a first display mode of displaying an image on said display unit on the basis of said pixel data outputted from said pixel data generator and a second display mode of displaying an image on said display unit on the basis of said second pixel element data generated in said pixel element data generator, wherein when selecting said second display mode, said controller sets a pixel number of said pixel data generated in said pixel data generator so as to coincide with a display pixel number of said display unit.

2. The image display system according to claim 1, further comprising an operating unit, through which an operator designates said pixel number of said pixel data generated in said pixel data generator;

wherein, when said second display mode is being selected and a value different from said display pixel number of said display unit is designated as said pixel number of said pixel data generated in said pixel data generator through said operating unit, said controller changes the current display mode to said first display mode.

3. The image display system according to claim 1, wherein, when said first display mode is being selected and a value different from said display pixel number of said display unit is designated as said pixel number of said pixel data generated in said pixel data generator, said controller performs interpolating processing over said pixel data generated in said pixel data generator so that said pixel number of said pixel data issued from said pixel data generator coincides with said display pixel number of said display unit.

4. The image display system according to claim 1, further comprising an edge enhancement processor which performs image processing to enhance an edge of an image to be displayed on said display unit;

wherein said controller causes said edge enhancement processor not to perform said image processing when said second display mode is being selected.

5. The image display system according to claim 1, further comprising a gradation characteristic controller which controls a gradation characteristic of said image to be displayed on said display unit;

wherein when selecting said second display mode, said controller controls operation of said gradation characteristic controller in such a manner that said gradation characteristic of said image to be displayed on said display unit is changed to a characteristic suitable for processing contents of said pixel element data generator.

6. The image display system according to claim 1, further comprising a memory which stores information on said display pixel number of said display unit.

7. An image display system comprising:

a display unit which includes regularly arranged red, green and blue pixel elements and which changes a displaying state of said pixel elements to display an image;

a pixel data generator which generates pixel data consisting of three items of first pixel element data corresponding to red, green and blue signal levels;

an operating unit, through which an operator designates a pixel number of said pixel data generated in said pixel data generator;

a pixel element data generator which converts said pixel data into several items of second pixel element data as a minimum unit data corresponding to said signal levels of the respective colors; and a controller which selects any one of a first display mode of displaying an image on said display unit on the basis of said pixel data outputted from said pixel data generator and a second display mode of displaying an image on said display unit on the basis of said second pixel element data generated in said pixel element data generator, wherein when said second display mode is being selected and a value different from a display pixel number of said display unit is designated as a pixel number of said pixel data generated in said pixel data generator through said operating unit, said controller changes the current display mode to said first display mode.

8. The image display system according to claim 7, wherein, when said first display mode is being selected and a value different from said display pixel number of said display unit is designated as said pixel number of said pixel data generated in said pixel data generator, said controller performs interpolating processing over said pixel data generated in said pixel data generator so that said pixel number of said pixel data issued from said pixel data generator coincides with said display pixel number of said display unit.

9. The image display system according to claim 7, further comprising an edge enhancement processor which performs image processing to enhance an edge of an image to be displayed on said display unit;

wherein said controller causes said edge enhancement processor not to perform said image processing when said second display mode is being selected.

10. The image display system according to claim 9, wherein when said second display mode is being selected and a command to execute said image processing for edge enhancement is received, said controller changes the current display mode to said first display mode.

11. The image display system according to claim 10, further comprising a gradation characteristic controller which controls a gradation characteristic of said image to be displayed on said display unit;

wherein when selecting said second display mode, said controller controls operation of said gradation characteristic controller in such a manner that said gradation characteristic of said image to be displayed on said display unit is changed to a characteristic suitable for processing contents of said pixel element data generator.

12. The image display system according to claim 7, further comprising a memory which stores information on said display pixel number of said display unit.

13. An image display system comprising:

a display unit which includes regularly arranged red, green and blue pixel elements and which changes a displaying state of said pixel elements to display an image;

a pixel data generator which generates pixel data consisting of three items of first pixel element data corresponding to red, green and blue signal levels;

a pixel element data generator which converts said pixel data into several items of second pixel element data as a minimum unit data corresponding to said signal levels of the respective colors;

an edge enhancement processor which performs image processing to enhance an edge of an image to be displayed on said display unit; and a controller which selects any one of a first display mode of displaying an image on said display unit on the basis of said pixel data outputted from said pixel data generator and a second display mode of displaying an image on said display unit on the basis of said second pixel element data generated in said pixel element data generator, wherein said controller causes said edge enhancement processor not to perform said image processing when said second display mode is being selected.

14. The image display system according to claim 13, wherein when said second display mode is being selected and a command to execute said image processing for edge enhancement is received, said controller changes the current display mode to said first display mode.

15. The image display system according to claim 13, further comprising a gradation characteristic controller which controls a gradation characteristic of said image to be displayed on said display unit;

wherein when selecting said second display mode, said controller controls operation of said gradation characteristic controller in such a manner that said gradation characteristic of said image to be displayed on said display unit is changed to a characteristic suitable for processing contents of said pixel element data generator.

16. The image display system according to claim 15, wherein when said second display mode is being selected and a command for said gradation characteristic controller to change a gradation is received, said controller changes the current display mode to said first display mode.

17. The image display system according to claim 13, further comprising a memory which stores information on said display pixel number of said display unit.

18. An image display system comprising:

a display unit which includes regularly arranged red, green and blue pixel elements and which changes a displaying state of said pixel elements to display an image;

a pixel data generator which generates pixel data consisting of three items of first pixel element data corresponding to red, green and blue signal levels;

a pixel element data generator which converts said pixel data into several items of second pixel element data as a minimum unit data corresponding to said signal levels of the respective colors;

a gradation characteristic controller which controls a gradation characteristic of said image to be displayed on said display unit; and a controller which selects any one of a first display mode of displaying an image on said display unit on the basis of said pixel data outputted from said pixel data generator and a second display mode of displaying an image on said display unit on the basis of said second pixel element data generated in said pixel element data generator, wherein when selecting said second display mode, said controller controls operation of said gradation characteristic controller in such a manner that said gradation characteristic of said image to be displayed on said display unit is changed to a characteristic suitable for processing contents of said pixel element data generator.

19. The image display system according to claim 18, wherein when said second display mode is being selected and a command for said gradation characteristic controller to change a gradation is received, said controller changes the current display mode to said first display mode.

20. The image display system according to claim 18, further comprising a memory which stores information on said display pixel number of said display unit.

21. A method for displaying an image, which is used in an image display system comprising a display unit which includes regularly arranged red, green and blue pixel elements and which changes a displaying state of said pixel elements to display an image; said method comprising:

generating pixel data consisting of three items of first pixel element data corresponding to red, green and blue signal levels by a pixel data generator;

converting said pixel data into several items of second pixel element data as a minimum unit data corresponding to said signal levels of the respective colors by a pixel element data generator; and selecting any one of a first display mode of displaying an image on said display unit on the basis of said pixel data outputted from said pixel data generator and a second display mode of displaying an image on said display unit on the basis of said second pixel element data generated in said pixel element data generator, wherein when selecting said second display mode, a pixel number of said pixel data generated in said pixel data generator is set so as to coincide with a display pixel number of said display unit.

22. The method according to claim 21, further comprising:

changing the current display mode to said first display mode, when said second display mode is being selected and a value different from said display pixel number of said display unit is designated as said pixel number of said pixel data generated in said pixel data generator through an operating unit.

23. The method according to claim 21, further comprising:

performing interpolating processing over said pixel data generated in said pixel data generator so that said pixel number of said pixel data issued from said pixel data generator coincides with said display pixel number of said display unit, when said first display mode is being selected and a value different from said display pixel number of said display unit is designated as said pixel number of said pixel data generated in said pixel data generator.

24. The method according to claim 21, wherein said image display system comprises an edge enhancement processor which performs image processing to enhance an edge of an image to be displayed on said display unit;

the method further comprising:

causing said edge enhancement processor not to perform said image processing when said second display mode is being selected.

25. The method according to claim 21, wherein said image display system comprises a gradation characteristic controller which controls a gradation characteristic of said image to be displayed on said display unit;

the method further comprising:

controlling operation of said gradation characteristic controller in such a manner that said gradation characteristic of said image to be displayed on said display unit is changed to a characteristic suitable for processing contents of said pixel element data generator, when selecting said second display mode.

26. The method according to claim 21, further comprising:

storing information on said display pixel number of said display unit in a memory.

27. A method for displaying an image, which is used in an image display system comprising a display unit which includes regularly arranged red, green and blue pixel elements and which changes a displaying state of said pixel elements to display an image; said method comprising:

generating pixel data consisting of three items of first pixel element data corresponding to red, green and blue signal levels by a pixel data generator;

designating a pixel number of said pixel data generated in said pixel data generator by an operator through an operating unit;

converting said pixel data into several items of second pixel element data as a minimum unit data corresponding to said signal levels of the respective colors by a pixel element data generator; and selecting any one of a first display mode of displaying an image on said display unit on the basis of said pixel data outputted from said pixel data generator and a second display mode of displaying an image on said display unit on the basis of said second pixel element data generated in said pixel element data generator, wherein when said second display mode is being selected and a value different from a display pixel number of said display unit is designated as a pixel number of said pixel data generated in said pixel data generator through said operating unit, the current display mode is changed to said first display mode.

28. The method according to claim 27, comprising:

performing interpolating processing over said pixel data generated in said pixel data generator so that said pixel number of said pixel data issued from said pixel data generator coincides with said display pixel number of said display unit, when said first display mode is being selected and a value different from said display pixel number of said display unit is designated as said pixel number of said pixel data generated in said pixel data generator.

29. The method according to claim 27, wherein said image display system comprises an edge enhancement processor which performs image processing to enhance an edge of an image to be displayed on said display unit;

the method further comprising:

causing said edge enhancement processor not to perform said image processing when said second display mode is being selected.

30. The method according to claim 29, further comprising:

changing the current display mode to said first display mode, when said second display mode is being selected and a command to execute said image processing for edge enhancement is received.

31. The method according to claim 27, wherein said image display system comprises a gradation characteristic controller which controls a gradation characteristic of said image to be displayed on said display unit;

the method further comprising:

controlling operation of said gradation characteristic controller in such a manner that said gradation characteristic of said image to be displayed on said display unit is changed to a characteristic suitable for processing contents of said pixel element data generator, when selecting said second display mode.

32. The method according to claim 27, further comprising:

storing information on said display pixel number of said display unit in a memory.

33. A method for displaying an image, which is used in an image display system comprising a display unit which includes regularly arranged red, green and blue pixel elements and which changes a displaying state of said pixel elements to display an image; said method comprising:

generating pixel data consisting of three items of first pixel element data corresponding to red, green and blue signal levels by a pixel data generator;

converting said pixel data into several items of second pixel element data as a minimum unit data corresponding to said signal levels of the respective colors by a pixel element data generator;

performing image processing to enhance an edge of an image to be displayed on said display unit by an edge enhancement processor; and selecting any one of a first display mode of displaying an image on said display unit on the basis of said pixel data outputted from said pixel data generator and a second display mode of displaying an image on said display unit on the basis of said second pixel element data generated in said pixel element data generator, wherein said edge enhancement processor does not perform said image processing when said second display mode is being selected.

34. The method according to claim 33 further comprising:

changing the current display mode to said first display mode, when said second display mode is being selected and a command to execute said image processing for edge enhancement is received.

35. The method according to claim 33, wherein said image display system comprises a gradation characteristic controller which controls a gradation characteristic of said image to be displayed on said display unit;

the method further comprising:

controlling operation of said gradation characteristic controller in such a manner that said gradation characteristic of said image to be displayed on said display unit is changed to a characteristic suitable for processing contents of said pixel element data generator, when selecting said second display mode.

36. The method according to claim 35, further comprising:

changing the current display mode to said first display mode, when said second display mode is being selected and a command for said gradation characteristic controller to change a gradation is received.

37. The method according to claim 33, further comprising:

storing information on said display pixel number of said display unit in a memory.

38. A method for displaying an image, which is used in an image display system comprising a display unit which includes regularly arranged red, green and blue pixel elements and which changes a displaying state of said pixel elements to display an image; said method comprising:

generating pixel data consisting of three items of first pixel element data corresponding to red, green and blue signal levels by a pixel data generator;

converting said pixel data into several items of second pixel element data as a minimum unit data corresponding to said signal levels of the respective colors by a pixel element data generator;

controlling a gradation characteristic of said image to be displayed on said display unit by a gradation characteristic controller; and selecting any one of a first display mode of displaying an image on said display unit on the basis of said pixel data outputted from said pixel data generator and a second display mode of displaying an image on said display unit on the basis of said second pixel element data generated in said pixel element data generator, wherein when selecting said second display mode, said gradation characteristic controller operates in such a manner that said gradation characteristic of said image to be displayed on said display unit is changed to a characteristic suitable for processing contents of said pixel element data generator.

39. The method according to claim 38, comprising:

changing the current display mode to said first display mode, when said second display mode is being selected and a command for said gradation characteristic controller to change a gradation is received.

40. The method according to claim 38, comprising:

storing information on said display pixel number of said display unit in a memory.

* * * * *